US007165471B2

(12) United States Patent
Joki et al.

(10) Patent No.: US 7,165,471 B2
(45) Date of Patent: Jan. 23, 2007

(54) THERMALLY COMPENSATED DIFFERENTIAL

(75) Inventors: Mark A. Joki, Dover, OH (US); Sharon E. Ross, Canton, OH (US)

(73) Assignee: The Timken Company, Canton, OH (US)

( * ) Notice: Subject to any disclaimer, the term of this patent is extended or adjusted under 35 U.S.C. 154(b) by 11 days.

(21) Appl. No.: 11/063,817

(22) Filed: Feb. 23, 2005

(65) Prior Publication Data

US 2005/0187062 A1 Aug. 25, 2005

Related U.S. Application Data

(60) Provisional application No. 60/547,118, filed on Feb. 24, 2004.

(51) Int. Cl.
*F16H 1/14* (2006.01)

(52) U.S. Cl. .......................... 74/424; 74/409; 475/230; 384/551; 384/583; 384/626

(58) Field of Classification Search .................. 74/409, 74/424, 56; 384/563, 626, 551; 475/230
See application file for complete search history.

(56) References Cited

U.S. PATENT DOCUMENTS

| | | | | |
|---|---|---|---|---|
| 1,759,640 | A * | 5/1930 | Brunner et al. | 384/538 |
| 1,916,233 | A * | 7/1933 | Riblet | 384/585 |
| 2,314,622 | A * | 3/1943 | Klamp | 384/563 |
| 2,588,670 | A * | 3/1952 | Terry | 475/246 |
| 3,001,842 | A | 9/1961 | Boyd | 308/236 |
| 3,202,466 | A * | 8/1965 | Kaptur | 384/557 |
| 3,708,857 | A * | 1/1973 | Pfeiffer | 29/407.05 |
| 3,770,994 | A * | 11/1973 | Smith | 384/583 |
| 3,901,568 | A * | 8/1975 | Gadd et al. | 384/589 |
| 4,611,935 | A * | 9/1986 | Rode | 384/548 |
| 5,046,870 | A * | 9/1991 | Ordo | 384/563 |
| 6,474,873 | B1 * | 11/2002 | Krisher et al. | 384/563 |

FOREIGN PATENT DOCUMENTS

| | | | |
|---|---|---|---|
| WO | WO 02/073054 | * | 9/2002 |
| WO | WO 02/093039 A1 | * | 11/2002 |

OTHER PUBLICATIONS

Notification of Transmittal of the International Search Report and the Written Opinion of the International Searching Authority, or the Declaration including a copy of the International Search Report and the Written Opinion of the International Searching Authority in International Application No. PCT/US2005/005703.

WO 02/073054 A1, Hansen Transmission International NV, Publication Date Sep. 19, 2002, Title: Gear Shaft Bearing Assembly.

WO 02/093039 A1, The Timken Company, Publication Date Nov. 21, 2002, Title: Automotive Differential.

* cited by examiner

*Primary Examiner*—Richard Ridley
*Assistant Examiner*—Terence Boes
(74) *Attorney, Agent, or Firm*—Polster, Lieder, Woodruff & Lucchesi, L.C.

(57) ABSTRACT

A thermally compensated differential comprises a housing, a pinion gear mounted into the housing, a differential case carrying a ring gear with the case being supported by a first roller bearing and a second roller bearing with the bearings being mounted indirectly, and the first and second roller bearings being contacted by adjustable spacers.

11 Claims, 4 Drawing Sheets

THERMALLY COMPENSATED DIFFERENTIAL

CROSS-REFERENCE TO RELATED APPLICATIONS

This application claims priority on U.S. Provisional patent application Ser. No. 60/547,118, entitled THERMALLY COMPENSATED DIFFERENTIAL that was filed on Feb. 24, 2004.

STATEMENT REGARDING FEDERALLY SPONSORED RESEARCH OR DEVELOPMENT

Not applicable.

BACKGROUND OF THE INVENTION

This invention relates in general to opposed antifriction bearings and, more particularly, to an apparatus or an installation method for setting antifriction bearings between a housing and a differential carrier or case or a gear reduction unit constructed of dissimilar materials or metals.

Differential gear mechanisms transfer rotational torque from an input shaft member to a pair of output shaft members. One typical application of a differential gear mechanism is that of an automobile with the pair of output shaft members having the rear wheels attached thereto. A torque generating device such as a gasoline engine or an electric motor is typically used to drive the input member. The torque from the torque generating device is transferred to the input shaft member of a differential gear mechanism by a yoke that is splined to engage with one end of the input shaft member. In a conventional differential gear assembly the output shaft members are generally positioned perpendicular to the input shaft member. Most differential gear mechanisms use a drive pinion gear that mates with an adjoining ring gear to transfer the torque from the input shaft member to the output shaft members. Antifriction bearings are incorporated into the differential gear assembly to allow all of the shaft members to rotate in a generally free manner. An example of an antifriction bearing is a tapered roller bearing. The tapered roller bearing includes a cone having an inner race, a cup having an outer race, and a plurality of roller elements contained within a roller cage positioned between the inner and outer races.

Some components that are found in a differential gear mechanism may include a housing that is used to enclose the mechanism and a differential carrier or case. In some differential gear mechanisms the housing is constructed of a lightweight material such as aluminum that has a high coefficient of thermal expansion. The differential carrier or case is constructed of iron, steel, or another metal that has higher strength than the housing and a lower coefficient of thermal expansion than aluminum. Due to the differences in the materials or metals used, thermal expansion between the iron differential carrier and the aluminum housing may occur. If thermal expansion occurs when the apices of the antifriction bearings are facing outward, then the housing will expand axially to a greater amount than the differential carrier causing the bearings to loosen. Additionally, the diameter growth of the housing bores containing the bearings will expand to a greater amount causing even more loosening of the bearings. If this occurs then the antifriction bearings found in the differential gear mechanism may become loose which can cause the mechanism to rotate improperly, wear unevenly or prematurely, fail, or produce noise.

In a typical automotive hypoid axle the antifriction bearings in the form of tapered roller differential bearings are installed with their apices facing outwardly. In an effort to compensate for the differences in the thermal properties of the aluminum housing and the iron differential carrier the bearings have been mounted with their apices directed toward each other. However, even if the antifriction bearings are facing inward, the axial expansion difference tightens the bearings while the diameter effects are the same, canceling out the opposite effects. In order to set or position the bearings, the bearings should operate in a condition of preload, which is characterized by an absence of clearances, both axial and radial, in the bearings. However, it has proven very difficult to set or assemble these bearings when their apices are orientated inwardly due to the required press fit on the differential case. It would be advantageous to compensate for thermal expansion between an aluminum housing and an iron differential carrier and to be able to set the bearings.

SUMMARY OF THE INVENTION

The present invention resides in a thermally compensated differential that uses antifriction bearings each having inner and outer races and rolling elements that roll along raceways on the races. The antifriction bearings each have a cage that is located between the races where it is interlocked with the rollers, so that the cage revolves between the races as the rollers roll along the raceways. The differential has a housing constructed of one material and a differential case that is constructed of another dissimilar material. The antifriction bearings are mounted indirectly. A pair of adjustable spacers is positioned next to the antifriction bearings. Each of the spacers has a wavy pattern on one surface so that when the spacers are placed next to each other the spacers may mate. Each of the spacers also has teeth that allow a tool to rotate one of the spacers relative to the other spacer to adjust the width between the spacers.

Accordingly, it will be recognized that an object of the present invention is to provide a thermally compensated differential that is capable of compensating for any thermal expansion that may occur due to dissimilar materials.

A further object of the present invention is to provide a thermally compensated differential that can be easily employed with highly reliable results.

Another object of the present invention is to provide a thermally compensated differential having adjustable spacers that can be adjusted to accurately set the bearings that are mounted indirectly.

A still further object of the present invention is to provide a thermally compensated differential that includes a method of setting antifriction bearings.

These and other objects and advantages of the present invention will become apparent after considering the following detailed specification in conjunction with the accompanying drawings.

DETAILED DESCRIPTION OF THE PREFERRED EMBODIMENTS

Figure 1:
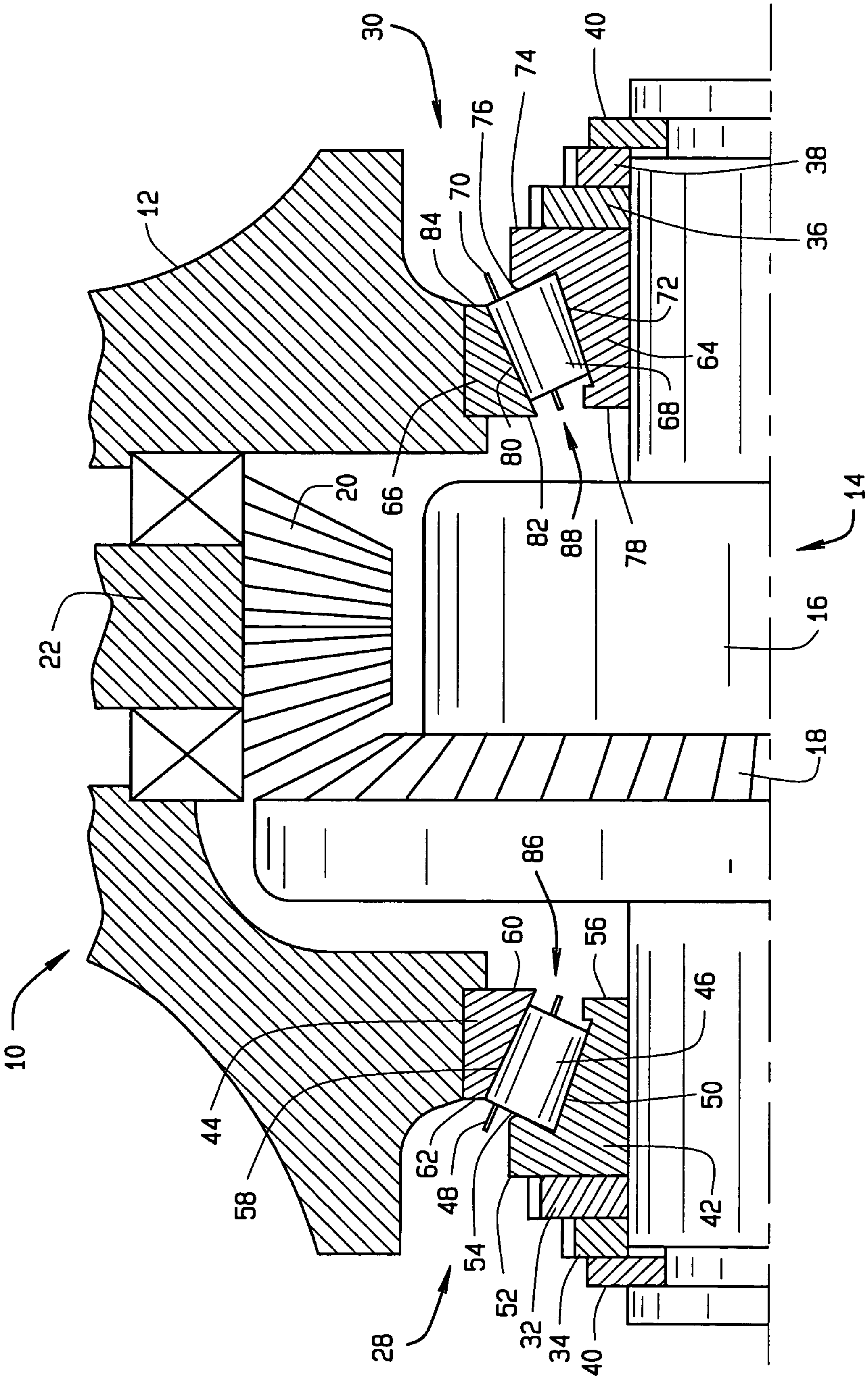
FIG. 1 is a partial cross sectional view of a thermally compensated differential constructed according to the present invention.

Referring now to the drawings and in particular to FIG. 1, a thermally compensated differential 10 constructed according to the present invention is shown. The thermally compensated differential 10 has an axle housing 12 that may be constructed from aluminum. The housing 12 is used to cover or house a differential gear mechanism 14. The mechanism 14 includes a differential case 16 that is constructed of a metal different from that which the housing 12 is constructed, a ring gear 18 that meshes with a beveled drive pinion 20, and a pinion shaft 22. The differential 10 is a specialized form of a gear reduction unit for automobile axles. A pair of roller bearings supports the pinion 20 and the pinion shaft 22. The housing 12 and the case 16 are supported by a first or left roller bearing assembly 28 and a second or right roller bearing assembly 30. A first pair of adjustable disks or spacers 32 and 34 are associated with the first roller bearing assembly 28 and a second pair of adjustable disks or spacers 36 and 38 are associated with the second roller bearing assembly 30. A snap ring 40 is used to retain the assemblies 28 and 30 and the spacers 32, 34, 36, and 38 in place.

The first roller bearing assembly 28 has an inner race in the form of a cone 42 and an outer race in the form of a cup 44, rolling elements in the form of tapered rollers 46, and a cage 48. The rollers 46 lie in a single row between the cone 42 and the cup 44. The cage 48 is used to maintain the correct spacing between the rollers 46 and to hold the rollers 46 around the cone 42 when the cone 42 is removed from the cup 44. The cone 42 has a tapered raceway 50, a back face 52, a thrust rib 54, and a front face 56. The cup 44 has a tapered raceway 58, a back face 60, and a front face 62.

The tapered rollers 46 fit between the cone 42 and the cup 44 with their tapered faces against the raceways 50 and 58 and against the thrust rib 54. The thrust rib 54 prevents the rollers 46 from moving up the raceways 50 and 58 and out of the space between the cone 42 and the cup 44.

The second roller bearing assembly 30 is similar in construction to the first roller bearing assembly 28 and has an inner race in the form of a cone 64 and an outer race in the form of a cup 66, rolling elements in the form of tapered rollers 68, and a cage 70. The rollers 68 lie in a single row between the cone 64 and the cup 66. The cage 70 is used to maintain the correct spacing between the rollers 68 and to hold the rollers 68 around the cone 64 when the cone 64 is removed from the cup 66. The cone 64 has a tapered raceway 72, a back face 74, a thrust rib 76, and a front face 78. The cup 66 has a tapered raceway 80, a back face 82, and a front face 84.

The tapered rollers 68 fit between the cone 64 and the cup 66 with their tapered faces against the raceways 72 and 80 and against the thrust rib 76. The thrust rib 76 prevents the rollers 68 from moving up the raceways 72 and 80 and out of the space between the cone 64 and the cup 66.

The first roller bearing assembly 28 and the second roller bearing assembly 30 are mounted in an indirect bearing mounting arrangement. The term "indirect bearing mounting arrangement" is a standard term within the bearing industry that identifies the physical mounting arrangement of two adjacent tapered roller bearings. Further, the rollers 46 each have an apex 86 and the rollers 68 each have an apex 88. The apices 86 face the apices 88.

Figure 2:
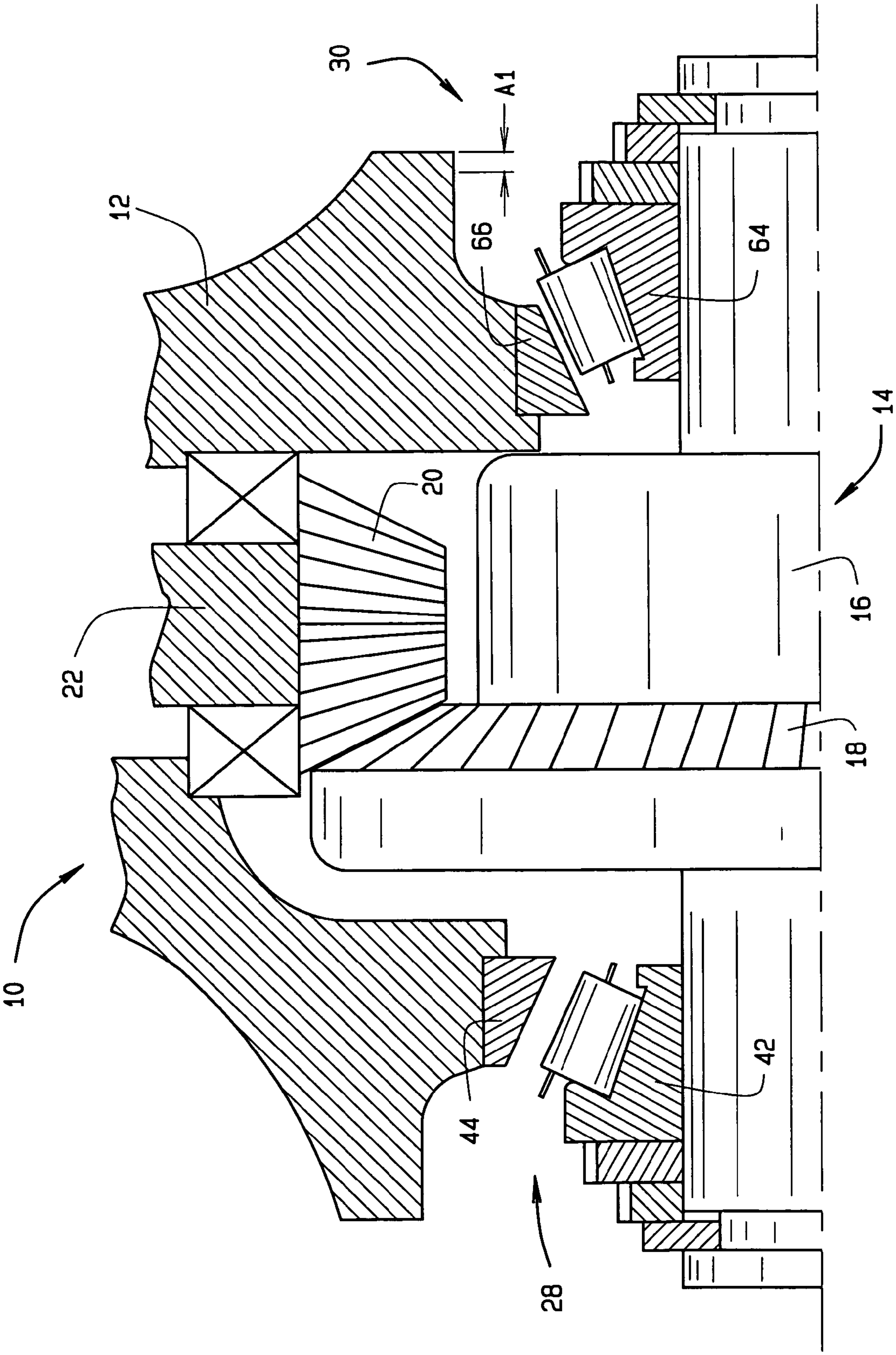
FIG. 2 is a partial cross sectional view of the thermally compensated differential in a first state of construction.

With reference now to FIG. 2, the initial step for constructing the thermally compensated differential 10 is illustrated. In this initial step the differential case 16 is inserted into the housing 12 and adjustment of the gear 18 and bearing preload are then accomplished in the following manner. The pinion 20 is installed in the housing 12 and then the case 16 is installed in the housing 12. The cup 44 of the first roller bearing assembly 28 and the cup 66 of the second roller bearing assembly 30 are installed in the housing 12 with an interference fit. The cone 42 of the first roller bearing assembly 28 and the cone 64 of the second roller bearing assembly 30 are partially pressed on the differential case 16. Although not shown, the first pair of adjustable spacers 32 and 34 is installed on the case 16 and the second pair of adjustable spacers 36 and 38 is also installed on the case 16. Also, although not shown, the snap rings 40 are used to retain the spacers 32, 34, 36, and 38. The differential case 16 is moved to the right for the ring gear 18 to contact or seat with the pinion 20. At this point a measurement of the dimension of $A_1$ is made, which represents the differential case 16 to housing 12 relationship at seated gear.

Referring again to FIG. 1, the A dimension is measured while adjusting the first pair of adjustable spacers 32 and 34 with the left bearing 28 being seated. The target value of A dimension to be set is equal to the sum of the measured $A_1$ dimension, the target gear clearance, and the desired preload dimension of the left or first bearing 28. The target gear clearance has been previously determined to provide the desired gear contact pattern. The final adjustment is made by adjusting the second pair of adjustable spacers 36 and 38 while measuring the A dimension. The target value of the A dimension to be set is equal to the sum of the measured $A_1$ dimension and the target gear clearance. As with all the measurements requiring a seated bearing, it is preferable that there is rotation of the bearings to improve accuracy. The required exact clearance between the gear 18 and the pinion 20 is now obtained.

Figure 3:
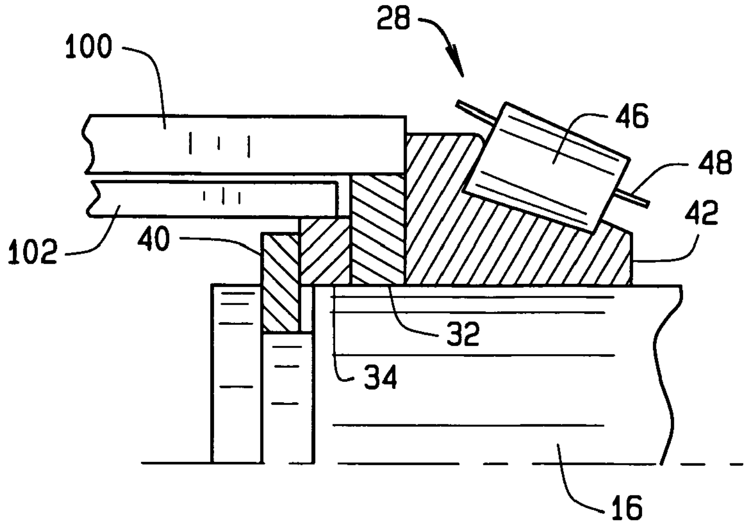
FIG. 3 is a partial cross sectional view of a pair of tools used to adjust spacers of the thermally compensated differential of the present invention.

FIG. 3 illustrates a tool 100 and a tool 102 that are used to adjust the first pair of adjustable spacers 32 and 34 to the desired A target dimension for the left or first roller bearing assembly 28. The tools 100 and 102 are used to drive or rotate the spacers 32 and 34. The second pair of adjustable spacers 36 and 38 may also be adjusted by using the tools 100 and 102 in the same manner. Once the first pair of adjustable spacers 32 and 34 and the second pair of adjustable spacers 36 and 38 are adjusted to the desired target dimensions, respectively, the spacers 32 and 34 are welded to each other and the spacers 36 and 38 are also welded to each other.

Figure 4:
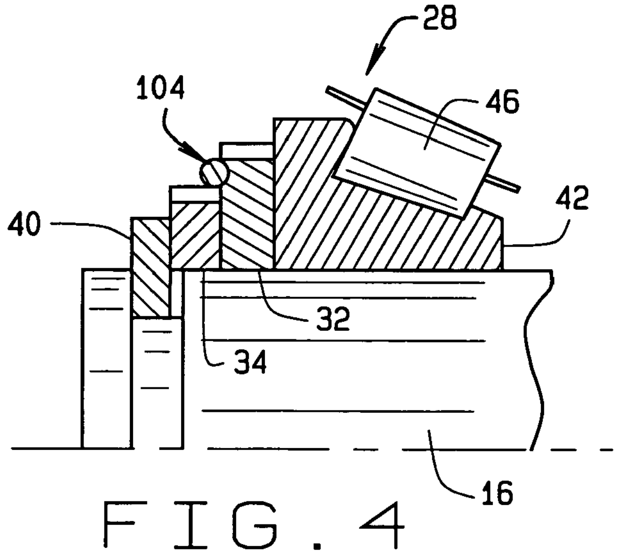
FIG. 4 is a partial cross sectional view of a weld for securing the spacers of the thermally compensated differential of the present invention.

With reference now to FIG. 4, a weld 104 is shown that is used to hold the spacers 32 and 34 together to prevent further movement or rotation of the spacers 32 and 34. Although not shown, the spacers 36 and 38 are welded to each other in the same manner.

Figure 5:
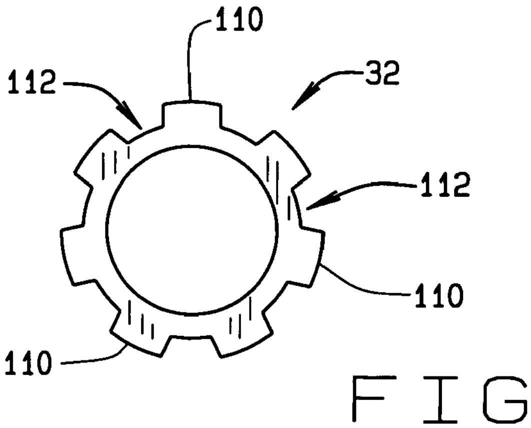
FIG. 5 is a front view of a spacer of the thermally compensated differential of the present invention.

FIG. 5 shows a perspective view of the configuration of the spacer 32. The spacer 32 is disk shaped having spline teeth 110 along an outer periphery of the spacer 32. Between each tooth 110 is an indentation area 112 that is shaped to allow the tool 100 to fit. The tool 100 is inserted into one of the indentations 112 to force movement of the spacer 32. The spacer 36 is similar to the spacer 32. Further, the spacers 34 and 38 are similar in construction to the spacer 32 except that the spacers 34 and 38 have a smaller diameter than the diameter of the spacer 32.

Figure 6:
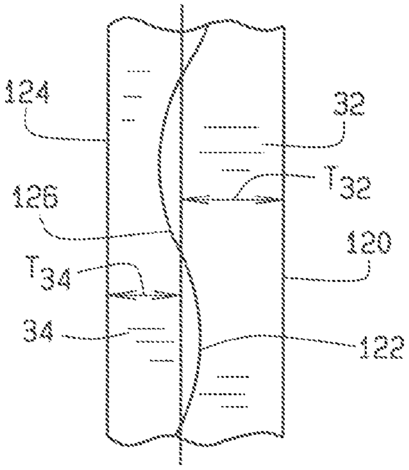
FIG. 6 is a partial side view of a pair of spacers mating with each other.
Figure 7:
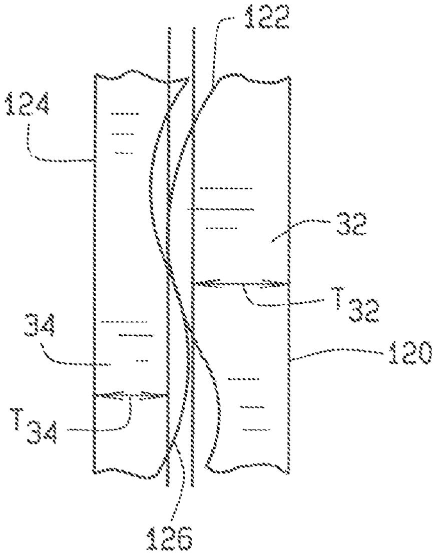
FIG. 7 is a partial side view of a pair of spacers being rotated relative to each other.

Referring now to FIG. 6, the spacers 32 and 34 are shown in a mating position. In particular, the spacer 32 has an outer face 120 and an inner face 122 with the inner face 122 being a wavy profile or pattern. The outer face 120 has a smooth or straight profile. The spacer 34 has an outer face 124 that has a smooth or straight profile and an inner face 126 that has a wavy profile or pattern. The wavy profiles 122 and 126 have an approximately 0.010 inch peak-to-valley height. There may be at least three waves on the faces 122 and 126. When installed, the inner faces 122 and 126 of the spacers 32 and 34 may nest against each other and in this manner the spacers 32 and 34 have an overall width that is at a minimum. If it is required to increase the width of the spacers 32 and 34, the tools 100 and 102 are used to rotate the spacers 32 and 34 relative to each other. When the spacers 32 and 34 are rotated relative to each other the overall thickness or width of the spacers 32 and 34 increases. FIG. 7 illustrates the spacers 32 and 34 being rotated to increase the width of the spacers 32 and 34. As indicated previously, when the desired width or the target dimension of the spacers 32 and 34 is attained, the spacers 32 and 34 are welded together to prevent any undesired relative rotation. The other spacers 36 and 38 may be rotated in a similar manner to attain the target dimension and once the target dimension is met the spacers 36 and 38 may be welded to each other to prevent further movement.

Figure 8A:
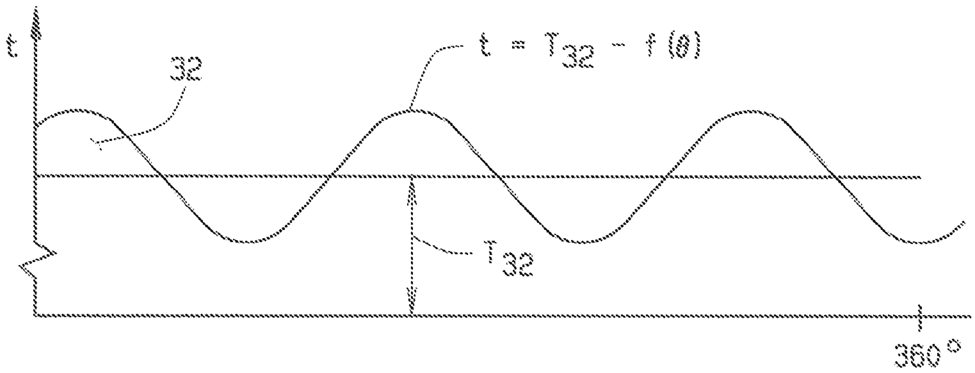
FIG. 8A is a graph of the thickness of one of the spacers of the thermally compensated differential as a function of rotational angle.
Figure 8B:
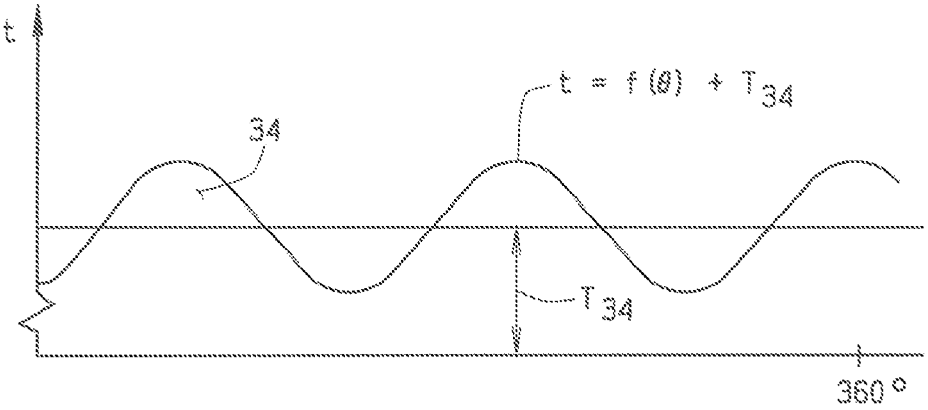
FIG. 8B is a graph of the thickness of the other one of the spacers of the thermally compensated differential as a function of rotational angle.

The thickness variation at each radial distance from the axis for opposing spacers 32 and 34 is defined by a specific function f(angle) as shown in FIGS. 8A and 8B. For example, the spacer 32 may have a thickness $t=0.155+0.005\times\sin(3\times angle)$ as is shown in FIG. 8A. Also, the spacer 34 may have a thickness $t=0.155-0.005\times\sin(3\times angle)$ as is shown in FIG. 8B at any and all radial distances from the axis. In this particular case, the maximum thickness of each spacer 32 and 34 is 0.16 inches. The entire inner faces 122 and 126 of the spacers 32 and 34, respectively, substantially conforms to these functions. This allows for the maximum contact area and also the lowest contact pressure to avoid wear of the spacers 32 and 34. As can be appreciated, the thickness variation at each radial distance from the axis of spacers 36 and 38 also conform to the opposing spacers 32 and 34 is defined by a specific function f(angle) as shown in FIGS. 8A and 8B. In particular, spacer 36 may have a thickness $t=0.155+0.005\times\sin(3\times angle)$ as is shown in FIG. 8A and the spacer 38 may have a thickness $t=0.155$ $0.005\times\sin(3\times angle)$ as is shown in FIG. 8B. Further spacers 32, 34, 36, and 38 having various dimensions or widths may be constructed to be used with the thermally compensated differential 10. Depending upon the calculations for the target dimensions, various spacers 32, 34, 36, and 38 of different widths may be used.

The diameter of the spacer or disk 32 is greater than the diameter of the spacer or disk 34. Also, the diameter of the spacer or disk 36 is greater than the diameter of the spacer or disk 38. The waviness of the inner surface 122 of the disk 32 is characterized by the thickness of the disk 32 at each radial distance from the disk's axis conforming to $t=T_{32}=f(ang)$ where $T_{32}$ is the baseline thickness of the disk 32 and f(ang) is a function of the angle of rotation of the disk 32 about its axis. The waviness of the inner surface 126 of the spacer or disk 34 is also characterized by the thickness of the disk 34 at each radial distance from the disk's axis. This conforms to $t=T_{34}-f(ang)$ where $T_{34}$ is the baseline thickness of the disk 34 and f(ang) is a function of the angle of rotation of the disk 34 about its axis. Further, the waviness of the inner surface of the disk 36 is similar to that of the disk 32 and the waviness of the inner surface of the disk 38 is similar to that of the disk 34. The function f(ang) may be defined as sin (n×ang) wherein n is greater than or equal to 3.

In practice, the thermally compensated differential 10 of the present invention may be constructed or assembled in the following manner. The pinion 20 is installed in the housing 12 and then the case 16 is installed in the housing 12. The cup 44 of the first roller bearing assembly 28 and the cup 66 of the second roller bearing assembly 30 are installed in the housing 12 with an interference fit. The cone 42 of the first bearing assembly 28 and the cone 64 of the second roller bearing assembly 30 are partially pressed on the differential case 16 to positions short of their final positions. The first pair of adjustable spacers 32 and 34 is installed on the case 16 and the second pair of adjustable spacers 36 and 38 is also installed on the case 16. The case 16 is then moved to the right in order for the gear 18 to contact the pinion 20. The dimensions $A_1$ is then measured. This represents the differential case axial location being measured. The first pair of adjustable spacers 32 and 34 is adjusted, and the snap ring 40 is then installed. The second pair of adjustable spacers 36 and 38 is adjusted, and then the snap ring 40 is installed. The first pair of adjustable spacers 32 and 34 and the second pair of adjustable spacers 36 and 38 are then welded to each other to prevent movement.

It will be appreciated that aspects of the embodiments of the present invention may be combined in various combinations to generate other alternative embodiments while staying within the scope of the present invention.

From all that has been said, it will be clear that there has thus been shown and described herein a thermally compensated differential which fulfills the various objects and advantages sought therefore. It will become apparent to those skilled in the art, however, that many changes, modifications, variations, and other uses and applications of the subject thermally compensated differential are possible and contemplated. All changes, modifications, variations, and other uses and applications which do not depart from the spirit and scope of the invention are deemed to be covered by the invention, which is limited only by the claims which follow.

What is claimed is:

1. A thermally compensated differential comprising a housing, a pinion gear mounted into the housing, a differential case carrying a ring gear with the differential case being supported about a longitudinal axis of rotation by a first roller bearing and a second roller bearing with the bearings being mounted indirectly, each of the first and second roller bearings being contacted by an associated adjustable spacer assembly including a cooperative pair of adjustable annular spacers;

wherein each of said cooperative pairs of adjustable annular spacers includes an inner adjustable annular spacer having an axially outward sinusoidal annular surface, and an outer adjustable annular spacer having an axially inward sinusoidal annular surface, said inner and outer sinusoidal surfaces in contact with each other;

wherein for each of said cooperative pairs of adjustable annular spacers, said sinusoidal annular surface of said inner adjustable annular spacer is characterized by a thickness of said inner spacer at each radial distance from an axis of said inner spacer, conforming to the equation $t=T_1+f(ang)$ where $T_1$ is the baseline thickness of said inner spacer and f(ang) is a function of an angle of rotation of said inner spacer about its axis; and wherein for each of said cooperative pairs of adjustable annular spacers, said sinusoidal annular surface of said outer adjustable annular spacer is characterized by a thickness of said outer spacer at each radial distance from an axis of said outer spacer conforming to the equation $t=T_2-f(ang)$ where $T_2$ is the baseline thickness of said outer spacer and f(ang) is a function of an angle of rotation of said outer spacer about its axis.

2. The thermally compensated differential of claim 1 wherein for each of said pairs of adjustable annular spacers, said inner and outer sinusoidal surfaces are adapted to nest with each other.

3. The thermally compensated differential of claim 1 wherein for each of said pairs of adjustable annular spacers, said inner and outer adjustable annular spacers are secured in a fixed relationship to each other.

4. The thermally compensated differential of claim 1 wherein for each of said pairs of adjustable annular spacers, said inner and outer adjustable annular spacers may be rotated relative to each other.

5. The thermally compensated differential of claim 1 further comprising snap rings for holding the adjustable spacer assemblies to the first and second roller bearings.

6. The thermally compensated differential of claim 1 wherein for each of said cooperative pairs of adjustable annular spacers, the inner adjustable annular spacer has a first diameter and the outer adjustable annular spacer has a second diameter and the first diameter is greater than the second diameter.

7. The thermally compensated differential of claim 1 wherein f(ang) is equal to sin(n×ang) where n is greater than or equal to 3.

8. The thermally compensated differential of claim 1 wherein each of said inner and outer adjustable annular spacers has a plurality of teeth on a radially outward periphery.

9. The thermally compensated differential of claim 8 wherein the teeth are adapted to be engaged by a tool to rotate the inner and outer adjustable annular spacers relative to each other.

10. An improved differential including a housing, a pinion gear mounted into the housing, a differential case carrying a ring gear engaged with the pinion gear, the differential case supported about a longitudinal rotational axis by at least one indirectly mounted roller bearing, the improvement comprising:

an adjustable spacer assembly disposed about the longitudinal rotational axis of said differential case, said adjustable spacer assembly including an inner adjustable annular spacer abutting a cone of said roller bearing and having an axially outward sinusoidal annular surface, and an outer adjustable annular spacer secured against longitudinal axial movement relative to said differential case and having an axially inward sinusoidal annular surface, said inner and outer sinusoidal surfaces in engagement with each other;

wherein said sinusoidal annular surface of said inner adjustable annular spacer is characterized by a thickness of said inner spacer at each point about said longitudinal axis, conforming to the equation $t=T_1-f(ang)$ where $T_1$ is the baseline thickness of said inner spacer and f(ang) is a function of an angle of rotation of said inner spacer about said axis; and wherein said sinusoidal annular surface of said outer adjustable annular spacer is characterized by a thickness of said outer spacer about said longitudinal axis conforming to the equation $t=T_2-f(ang)$ where $T_2$ is the baseline thickness of said outer spacer and f(ang) is a function of an angle of rotation of said outer spacer about said axis; and whereby a relative rotational position of said inner and outer sinusoidal surfaces establishes a bearing setting for said differential.

11. The differential of claim 10 wherein f(ang) is equal to sin(n×ang) where $n \geqq 3$.

* * * * *